United States Patent
Wantling et al.

(10) Patent No.: US 7,473,712 B2
(45) Date of Patent: *Jan. 6, 2009

(54) EMULSIONS FOR COMPOSITE MATERIALS

(75) Inventors: Steven J. Wantling, Brandon, MS (US); Bonnie S. Zepka, Louisville, KY (US)

(73) Assignee: Hexion Specialty Chemicals, Inc., Columbus, OH (US)

( * ) Notice: Subject to any disclaimer, the term of this patent is extended or adjusted under 35 U.S.C. 154(b) by 514 days.

This patent is subject to a terminal disclaimer.

(21) Appl. No.: 10/525,912

(22) PCT Filed: Jun. 5, 2003

(86) PCT No.: PCT/US03/17877

§ 371 (c)(1), (2), (4) Date: Feb. 25, 2005

(87) PCT Pub. No.: WO2004/044086

PCT Pub. Date: May 27, 2004

(65) Prior Publication Data

US 2006/0030629 A1 Feb. 9, 2006

Related U.S. Application Data

(60) Provisional application No. 60/425,977, filed on Nov. 13, 2002.

(51) Int. Cl.
- B01F 3/08 (2006.01)
- C08L 91/06 (2006.01)
- C08L 3/00 (2006.01)
- D21H 21/16 (2006.01)
- C04B 24/38 (2006.01)
- C09D 103/04 (2006.01)
- D21H 17/60 (2006.01)

(52) U.S. Cl. .......... 516/38; 106/162.1; 106/18.29; 106/781; 106/164.3

(58) Field of Classification Search .......... 516/38; 106/162.1, 164.3, 18.29, 781, 177
See application file for complete search history.

(56) References Cited

U.S. PATENT DOCUMENTS

| | | | |
|---|---|---|---|
| 2,198,776 A | 4/1940 | King et al. | 154/86 |
| 2,699,414 A | 1/1955 | Selbe et al. | 154/45.9 |
| 3,869,414 A | 3/1975 | Campbell | |
| 3,891,453 A | 6/1975 | Williams | 106/85 |
| 3,935,021 A | 1/1976 | Greve et al. | 106/111 |
| 4,019,920 A | 4/1977 | Burkard et al. | 106/114 |
| 4,042,409 A | 8/1977 | Terada et al. | 106/111 |
| 4,094,694 A | 6/1978 | Long | |
| 4,174,230 A | 11/1979 | Hashimoto et al. | |
| 4,239,716 A | 12/1980 | Ishida et al. | 264/86 |
| 4,328,178 A | 5/1982 | Kossatz | 264/69 |
| 4,392,896 A | 7/1983 | Sakakibara | |
| 4,421,704 A | 12/1983 | Reily | 264/133 |
| 4,645,548 A | 2/1987 | Take et al. | 186/39 |
| 4,734,163 A | 3/1988 | Eberhardt et al. | 162/181.3 |
| 4,748,196 A | 5/1988 | Kuroda et al. | |
| 5,009,269 A | 4/1991 | Moran et al. | |
| 5,120,355 A | 6/1992 | Imai | 106/2 |
| 5,320,677 A | 6/1994 | Baig | 106/780 |
| 5,437,722 A | 8/1995 | Borenstein | 106/778 |
| 5,482,551 A | 1/1996 | Morris et al. | |
| 5,695,553 A | 12/1997 | Claret et al. | |
| 5,922,447 A | 7/1999 | Baig | |
| 5,968,237 A | 10/1999 | Sinnige | |
| 5,980,628 A | 11/1999 | Hjelmeland et al. | |
| 6,010,596 A | 1/2000 | Song | |
| 6,066,201 A | 5/2000 | Wantling | 106/271 |
| 6,162,839 A | 12/2000 | Klauck et al. | |
| 6,165,261 A | 12/2000 | Wantling | 106/778 |
| 6,172,122 B1 | 1/2001 | Lawate et al. | |
| 6,231,656 B1 | 5/2001 | Dekerf et al. | 106/38.25 |
| 6,251,979 B1 | 6/2001 | Luuongo | 524/423 |
| 6,287,495 B1 | 9/2001 | Rosthauser | 264/109 |
| 6,673,144 B2 | 1/2004 | Immordino, Jr. et al. | 106/778 |
| 7,294,189 B2 * | 11/2007 | Wantling | 106/164.3 |

FOREIGN PATENT DOCUMENTS

WO    WO 03/004433 A1    1/2003

OTHER PUBLICATIONS

PCT International Search Report dated Dec. 31, 2003.

* cited by examiner

Primary Examiner—Daniel S Metzmaier

(57) ABSTRACT

Emulsions are provided which are useful in imparting water-resistance to lignocellulosic composite products. In one embodiment, the emulsions comprise at least one wax, an alkyl phenol, a salt of polynaphthalenesulfonic acid, and a complexed starch. Emulsions of this embodiment may be added to hot, even boiling, water without the emulsion separating or curdling. The emulsions of the present invention are stable for extended periods of time when stored at room temperature, do not require the addition of a bactericide, and are pourable liquids at room temperature.

21 Claims, No Drawings

EMULSIONS FOR COMPOSITE MATERIALS

This application claims the benefit of U.S. Provisional Application No. 60/425,977, filed 13 Nov. 2002.

FIELD OF THE INVENTION

The present invention relates to emulsions useful in improving the water-resistance of lignocellulosic composite products. The emulsion includes a wax or a combination of waxes, an alkyl phenol, a salt of polynaphthalenesulfonic acid, and a complexed starch. The present invention further relates to a method of making the emulsion and the lignocellulosic composite products containing the emulsion.

BACKGROUND OF THE INVENTION

Lignocellulosic composites are conventionally manufactured by hot pressing lignocellulosic materials with wax and thermosetting resin. This is referred to as a conventional bonding process. The wax is a sizing agent to improve the water resistance of the once-formed composite. The resin is a bonding agent that holds the materials comprising the composite together, thus forming them into a unitary shape. Resoles are commonly used as the binding resin for lignocellulosic composites.

In the conventional hot press method of manufacture of lignocellulosic composites, a lignocellulosic material is combined with a phenolic resin and other components in a blender or mixer. The blend or mixture that results is pressed, typically under pressures above atmospheric and temperatures greater than room temperature, to produce the composite. Lignocellulosic materials used in the production of mats may be selected from the group consisting of wood fiber, wood flake, wood strands, wood chips and wood particles, and mixtures thereof. The lignocellulosic materials listed here are referred to in the art as wood furnish. However, it is well known that other wood furnish, such as straw, bagasse, wood bark, recycled wood fiber, recycled paper fiber, and mixtures thereof, may also be used. The wood furnish, once blended or mixed with the phenolic resin, is then formed onto a support material to make a pre-form in the approximate shape of the finished good. The pre-form is then placed on a caul plater in a hot press where the finished good is produced by applying pressures above atmospheric and temperatures greater than room temperature. The elevated temperatures and pressures cause the phenolic resin to polymerize, thus biding the pre-form into a unitary finished good. The hot press method is further described in U.S. Pat. No. 4,433,120 to Shui-Tung Chiu.

Lignocellulosic composites primarily find use in construction or fabrication. These composites may be used in building construction or any fabrication where wood is a traditional material used. The poor dimensional stability of state-of-the-art lignocellulosic composites affects their mechanical properties and reduces their load carrying ability. Another result of poor dimensional stability is unevenness of roof and floor underlayments, and of building siding. Two methods have been principally suggested as means to produce dimensionally stable lignocellulosic composites. However, both of these methods have proven to be too costly to be used in practice. The first method is referred to as Bulking Treatment. In this method, lignocellulosic materials are impregnated with water soluble polymers such as polyethylene glycol or impregnated with a low molecular weight resin such as phenol-formaldehyde or vinyl monomers and polymerized in situ. The second method is referred to as Chemical Modification. In this method, the lignocellulose may be esterified by, for example, acetylation, or it may be cross-linked using, for example, an aldehyde. An alternative method of Chemical Modification is to react hemicellulose with lignin under elevated temperatures, typically using steam treatment. Any of these methods of Chemical Modification, in addition to being costly, also result in reduced strength of the once-formed composite.

A method widely used in the conventional bonding process to improve dimensional stability, as noted above, is the application of a wax sizing agent. The wax sizing imparts a certain degree of water repellency to the once-formed composite. Paraffin is a compound sizing agent. One method by which wax sizing impart water repellency is by coating the surface of the lignocellulose, thus decreasing its surface tension. Another method by which wax sizing imparts water repellency is that wax will partially fill the capillaries within the lignocellulose, thus providing a barrier to the capillary uptake of water.

The phenol-formaldehyde resin used in the manufacture of lignocellulosic composites may be in the form of a solid or a liquid. Powdered phenolic resins, such as novolac, resole, or combinations thereof, may generally be used. U.S. Pat No. 4,098,770 to Berchem, et al., discloses a typical spray-dried phenol-formaldehyde resin, modified with added non-phenolic polyhydroxy compounds, used in the manufacture of waferboard. Liquid phenol-formaldehyde resins, such as resole or resole and novolac combinations, may also be generally used in the manufacture of lignocellulosic composites. Parameters for the manufacture of either liquid or solid phenol-formaldehyde resins are disclosed in *Phenolic Resins, Chemistry, Applications and Performance,* (A. Knop and I. A. Pilato, Springer-Verlag (1985)) and *Advance Wood Adhesives Technology,* (A Pizzi, Marcel Deldcer (1994)).

There is a need for lignocellulosic composites that are dimensionally stable when exposed to moisture. There is a further need for lignocellulosic composites that do not swell when immersed in water and that do not shrink when dried.

SUMMARY OF THE INVENTION

Embodiments of the present invention provide an additive emulsion in the production of lignocellulosic composites and a method for making the emulsion that addresses the issues of water absorption, viscosity control, stability, and slurry fluidity.

In one embodiment, the present invention provides an emulsion including at least one wax, an alkyl phenol, a polynaphthalenesulfonic acid, an alkali metal hydroxide, and a complexed starch. The polynaphthalenesulfonic acid and the alkali metal hydroxide react to give a salt of polynaphthalenesulfonic acid. Emulsions of this embodiment may be added to hot, even boiling, water without the emulsion separating or curdling. The emulsions of the present invention are stable for extended periods of time when stored at room temperature, do not require the addition of a bactericide, and are pourable liquids at room temperature. The emulsions of the present invention are useful in providing water-resistance to a lignocellulosic composite product.

In another embodiment, the present invention provides a method for making an emulsion, including the steps of:

(a) mixing at least one wax and an alkyl phenol to provide a first pre-mix;

(b) mixing polynaphthalenesulfonic acid, an alkali metal hydroxide, water, and a complexed starch to provide a second pre-mix;

(c) combining the first pre-mix and the second pre-mix to provide a mixture; and (d) homogenizing the mixture.

The emulsions of the present invention are useful in providing water-resistance to a lignocellulosic composite product.

In another embodiment, the present invention provides an emulsion including at least one wax, an alkyl phenol, a polynaphthalenesulfonic acid, an alkali metal hydroxide, and a starch.

The invention is further directed to a lignocellulosic composite product containing an emulsion of the present invention.

DETAILED DESCRIPTION OF THE INVENTION

There is provided in accordance with the principles of the present invention an emulsion which is useful in imparting water-resistance properties to lignocellulosic composite products. The emulsions of the present invention may be added to mixtures of lignocellulosics without adversely affecting properties of the mixture which are necessary to the manufacture of lignocellulosic composite products.

This invention is directed to the production of composite panels made from lignocellulosic material. Examples of lignocellulosic materials include, but are not limited to, wood fiber, wood flake, wood strands, wood chips and wood particles, straw, bagasse, wood bark, recycled wood fiber, recycled paper fiber, and mixtures thereof. The composite panels produced are known as fiberboard, waferboard, strandboard, oriented strandboard, flakeboard, particleboard and the like.

In the manufacture of lignocellulosic composite products it is important to impart water-resistance to the finished product, so as to limit the maximum water absorption realized by the wallboard in a defined board soak test. For example, American Standards for Testing Materials ASTM 1396 and sub parts thereof describe such a test.

Prior art emulsions employ generic starch compounds which require cooking time/temperatures to reach a gelation state at which a particular viscosity is achieved. The initial viscosity moves through and continues to move through a number of ranges influenced by storage conditions and additive chemistry. This contributes to the unpredictable nature of these systems. It has been discovered that by utilizing starch compounds such as acid-modified, hydroxyethylated, oxidized, and/or cationic, in combination with a complexing agent and a salt of polynaphthalenesulfonic acid coupled with a polymerized alkyl phenol all in a correct relationship, that the noted deficiencies are corrected and a resulting wax emulsion having superior performance as a water absorption control additive is achieved. These newly discovered combinations provide a higher level of stability both at high and low temperatures, provide an unchanging and predictable viscosity, eliminate the need for the addition of biocides, needed in the former systems to control bacteriological activity, and provide an even higher level of water-resistance over other additive products. This newly discovered chemistry eliminates the need for the sodium lignosulfate previously used as both a cosurfactant and a dispersing aid which therefore eliminates the need for a biocide to control biological activity.

It has further been discovered that borate compounds, molybdate compounds, and molybdenum compounds are surprisingly effective complexing agents. Hereinafter, generically, molybdate and molybdenum compounds of the present invention will be referred to as molybdenum compounds. Examples of useful complexing agents include, but are not limited to, sodium borate, magnesium borate, and other borate compounds; ammonium molybdate, sodium molybdate, magnesium molybdate, and other molybdate compounds; molybdenum disulfide and other molybdenum compounds.

The ratio of complexing agent (for example, sodium tetraborate decahydrate, sodium molybdate dihydrate, molybdenum disulfide, or other compounds) to the modified starch significantly influences the control of other necessary properties in the board/slurry process, i.e. foam support and slurry additive compatibility.

It has further been discovered that these combinations and the ratios thereof are unique and necessary to formulate a stable and performing wax emulsion. The range of ratios of starch:borate, or starch:molybdenum compound may range from about 4:1 to about 20:1 on a weight/weight basis.

In one embodiment of the present invention, water, a complexing agent (that is, a borate compound, or a molybdenum compound) and a starch are first brought together in order to make the complexed starch useful in embodiments of the present invention. Next, polynaphthalenesulfonic acid and potassium hydroxide are added to the aqueous solution of complexed starch. This mixture is brought to a temperature of about 185° F. to about 205° F. and held until the starch reaches its maximum state of gelation, which typically occurs in about 20 to about 30 minutes. The wax compounds are incorporated with the polymerized alkyl phenol and brought to a temperature of about 185° F. to about 205° F. Then, the wax phase is added to the water phase and reacted to form an in situ surfactant. A detergent/dispersant is formed by the combination and reaction of the polymerized alkyl phenol and the polynaphthalenesulfoilic acid, which acts to modify the wax crystal and allows the wax crystals to resist plating and linking with themselves and instead remain in a disassociated state until they are transferred due to polarity to the lignocellulosic composite. The reacted system is then passed through a homogenizer at a pressure of about 2,000 to about 4,000 psi and then cooled at a prescribed rate to control the stability and viscosity of the finished wax emulsion. The homogenized composition exits the homogenizer at a temperature of about 135° F. to about 145° F. The mixture is then cooled to about 80° F. to about 110° F. The cooling rate is controlled to avoid causing the wax to recrystallize and breakout of solution.

It is discovered that by utilizing the modified starch compounds in combination and proper ratios with other noted compounds, that a low viscosity system can be developed allowing a broader range of solids, from about 40% to about 60% by weight to be available and usable.

Preparation of Emulsions:

Emulsions were prepared by heating the wax and surfactants ("wax mixture") in one vessel and the water, complexing agent (a borate compound, or a molybdenum compound) and corn starch ("water mixture") in another vessel. Both mixtures were heated, with mixing, to about 185° F. (85° C.). Next, the wax mixture was poured into the water mixture under mixing. The resultant mixture was then placed in a homogenizer. With homogenization it is preferred that a distribution of micelle diameters ranging from about 0.6 micron to about 1.8 micron be achieved. However, the distribution of micelle diameters may range from about 0.5 micron to about 2.5 micron. This level of homogenization may be attained, for example, by using a dual orifice homogenizer operating at from about 2,000 to about 4,000 psig.

It is preferred that the homogenized mixture be cooled after the homogenization step. It is most preferable that the homogenized mixture be cooled from approximately 185° F. to about 100° F. This may be accomplished by running the homogenized mixture through a cooling coil immersed in water maintained at room temperature.

HLB Values:

The hydrophilic/lipophilic balance ("HLB") value describes the relationship of a compound to its solubility in water. An emulsifier having a low HLB value will tend to be oil soluble and one having a high HLB value will tend to be water soluble. Typically, a water soluble emulsifier or blends thereof are used to make an oil/water emulsion typical of those described herein, or to solubilize oils or waxes, or to obtain some measure of detergent action. Thus, the HLB value can be used to describe or select the proper emulsifier or emulsifier system.

Where two or more components are combined, the HLB value of the combination is the weighted average of the individual HLB values. The following formula may be used to calculate the HLB value of a combination of materials:

$$HLB(\text{combined}) = \frac{Q_1 x(HLB_1) + Q_2 x(HLB_2) + \ldots Q_n x(HLB_n)}{Q_1 + Q_2 + \ldots Q_n};$$

where, $Q_1$=weight of material 1; $HLB_1$=HLB value of material 1
$Q_2$=weight of material 2; $HLB_2$=HLB value of material 2
$Q_n$=weight of material n; $HLB_n$=HLB value of material n Materials:

Various sources of lignocellulosic composite may be used in the compositions of the present invention. Examples of lignocellulosic materials include, but are not limited to, wood fiber, wood flake, wood strands, wood chips and wood particles, straw, bagasse, wood bark, recycled wood fiber, recycled paper fiber, and mixtures thereof.

Waxes useful in making the various embodiments of the present invention may be selected from any of the commercially known waxes which have a melting point of from about 120° F. to about 150°, and preferably from about 135° F. to about 145°. Such waxes are typically of low volatility, exhibiting less than about a 10% loss in weight during standard thermogravimetric analysis. Also, the oil content of these waxes is typically less than about 1% by weight. These waxes are of a relatively high molecular weight, having an average chain length of $C_{36}$ that is a 36 carbon chain length, or greater. Preferred waxes include, but are not limited to Wax 3816 available from Honeywell/Astor of Duluth, Ga., Exxon 600 Slack Wax, Ashland 200 Slack Wax, and a combination of 50 parts Exxon 600 Slack Wax and 50 parts Ashland 200 Slack Wax.

In certain embodiments, it is useful to saponify one or more of the waxes. In this way, the saponified wax functions as an added surfactant. Waxes useful in this respect are limited to waxes having an acid value or a saponification value and a melting point greater than about 180° F. Saponification of such waxes may be accomplished by combining the wax with a strongly basic material such as sodium hydroxide or potassium hydroxide. Waxes which may be saponified in the emulsions of the present invention include montan wax, carnauba wax, beeswax, bayberry-myrtle wax, candelilla wax, caranday wax, castor bean wax, esparto grass wax, Japan wax, ouricury wax, retamo-ceri mimbi wax, shellac, spermaceti wax, sugar cane wax, wool-lanolin wax, and others. The amount of strongly basic material needed to saponify a wax may be calculated based on the saponification value of the wax. For example, the saponification value divided by 1000 equals the grams of potassium hydroxide to add per gram of wax.

Starch used in the emulsions of the present invention is complexed starch. The starch may be complexed in situ, during manufacture of the emulsion, or the starch may be pre-complexed prior to being added to the emulsion. Starch is preferably complexed by mixing the starch with a complexing agent such as a borate compound or a molybdenum compound. A preferred borate compound is sodium tetraborate decahydrate. Other compounds useful as complexing agents include ammonium biborate, ammonium pentaborate, sodium tetraborate (borax), potassium pentaborate, potassium tetraborate, lithium tetraborate, and magnesium borate compounds; ammonium dimolybdate, ammonium heptamolybdate, barium molybdate, calcium molybdate, lithium molybdate, magnesium molybdate, sodium molybdate, and potassium molybdate; molybdenum disulfide, and other molybdenum compounds, and the like. The starch useful in making the complexed starch of the present invention includes, but is not limited to, corn, rice, wheat, potato, sago and other starches. The ratio of complexing agent (a borate compound, or a molybdenum compound) to starch is important to the functionality of the complexed starch in the emulsions. It has been found that the ratio may be as low as 1:20, of complexing agent (a borate compound, or a molybdenum compound) to starch on a weight per weight basis. The ratio may be as high as 1:3.5, however it has been found that at this ratio, and higher ratios, a greater amount of complexed starch is needed in the emulsion to maintain the balance of desired properties in the wood furnish mixture and final lignocellulosic composite product.

Incorporating alkyl phenols into the emulsions has been found important to achieving low water absorption in the final lignocellulosic composite product. As used herein, "alkyl phenols" refer to phenolic compounds having a long chain alkyl group. The long chain allyl group may be straight or branched. The long chain alkyl group may be $C_{24}$-$C_{34}$ (from 24 to 34 carbon chain length). Such alkyl phenols include long chain, $C_{24}$-$C_{34}$ (from 24 to 34 carbon chain length) polymerized methylene-coupled alkyl phenol, phenate salts, calcium phenates, long branched chain calcium alkyl phenols, long straight chain calcium alkyl phenols and complex polymers of maleic acid with and without an amine group substitution. One example of an alkyl phenol useful in the compositions of the present invention is described below.

| Identification No. | Description | Source |
| --- | --- | --- |
| 319H | $C_{24}$-$C_{34}$ polymerized methylene-coupled alkyl phenol | Lubrizol Chem. Corp. Wycliffe, Ohio |

The amount of alkyl phenol present in the emulsion ranges from about 0.25 to about 10 wt. %, based on the total weight of the emulsion.

Starch compounds such as acid-modified, hydroxyethylated, oxidized, and/or cationic may also be added to the emulsion. The amount of starch ranges from about 0.1 to about 2 wt. %, based on the total weight of the emulsion.

In certain embodiments which use a single wax additive, it has been found that a dual surfactant system provides a stable emulsion at both room temperature and elevated temperatures. Such stable emulsions may be added, for example, to hot or boiling water, without the emulsion separating or curdling. The dual surfactant system uses a unique ratio of the component surfactants to provide an HLB value within a range of about 8.9 to about 14. It is preferred that the component surfactants each have an HLB value greater than 6. One example of a dual surfactant system of the present invention is a combination of dodecylisopropanolamine benzene sulfonate and a nonionic ethoxylated aryl phenol. Dodecylisopropanolaimine benzene sulfonate may be obtained from Unichema, Wilmington, Del., under the trade name SD1121. One nonionic ethoxylated aryl phenol is Ethox 2938, available from Ethox Corp., Greenville, S.C. Alternatively, an alkoxylated fatty acid ester may be combined with the of dodecylisopropanolamine benzene sulfonate to form the dual surfactant system. One alkoxylated fatty acid ester is Ethox 2914, also available from Ethox Corp., Greenville, S.C.

Bactericides/fungicides can be included in the present invention. An example of a bactericide fungicide is META-SOL D3TA, which is 3,5-dimethyl-tetrahydro-1,3,5,2H-thiadiazine-2-thione. METASOL D3TA may be obtained from Ondo-Nalco, Houston, Tex.

A salt of polynaphthalenesulfonic acid is required by the present invention. An example of a polynaphthalenesulfonic acid is DISAL GPS. The polynaphthalenesulfonic acid and an alkali metal hydroxide are reacted to give a salt of the polynaphthalenesulfonic acid. DISAL GPS may be obtained from Handy Chemical, Montreal, Quebec, Canada.

Wax Emulsions including Polynaphthalenesulfonic Acid

An emulsion can be formed by combining and homogenizing at least one wax, an alkyl phenol, a salt of polynaplithalenesulfonic acid, and a complexed starch. Table 1 below provides an example of an emulsion made according to this embodiment.

TABLE 1

WAX EMULSIONS INCLUDING POLYNAPHTHALENESULFONIC ACID

| Component | Amount in Grams |
| --- | --- |
| Wax 3816 | 33.00 |
| Montan Wax | 3.30 |
| Alkyl Phenol | 0.50 |
| DISAL GPS | 1.00 |
| Water | 59.50 |
| Borax | 0.37 |
| Acid-modified C150 Starch | 1.60 |
| 45% KOH | 0.75 |

In addition, similar emulsions can be made using a molybdenum compounds as a complexing agent, replacing the Borax used above. The emulsion of the present invention can include a starch. The emulsion of the present invention can include a complexed starch that is a complex of a starch and a complexing agent selected from a borate compound, a molybdenum compound, and the like.

Typical composition ranges for the compositions of the present invention are provided in Table 2 below.

TABLE 2

TYPICAL COMPOSITION RANGES

| Component | Typical Amount (% weight basis) |
| --- | --- |
| First Wax | 25-40 |
| Saponifiable Wax | 2.5-4.5 |
| Alkyl Phenol | 0.25-10.0 |
| Polynaphthalenesulfonic Acid | 0.25-5.0 |

TABLE 2-continued

TYPICAL COMPOSITION RANGES

| Component | Typical Amount (% weight basis) |
| --- | --- |
| Water | 55-65 |
| Starch + Complexing Agent (4:1 to 20:1) | 1.5-3.5 |
| Alkali Metal Hydroxide | Amount used depends on amount of saponifiable wax; typically 0.5-1.5 |

The use of borates or trisodium phosphate in emulsions imparts two additional benefits to the lignocellulosic composite products employing such emulsions. For example, borates and trisodium phosphate are useful as fire retardant compounds and these compounds are natural biocides. Therefore, incorporation of a fire retardant compound into a lignocellulosic composite product can present certain advantages to the users of these lignocellulosic composite products. Also, the emulsions of the present invention do not require the further addition of another biocide to prevent bacterial growth in the emulsions.

Oriented strand board was manufactured by the conventional hot press method using the emulsion of Table 1. Lignocellulosic material was combined with a resin and the emulsion of the present invention in a mixer. The wood furnish, once mixed with the resin and the emulsion of the present invention, was formed onto a support material to make a pre-form for 7/16 inch and 5/8 inch oriented strand board. The pre-form was then placed on a caul plate in a hot press where the finished good is produced by applying pressures above atmospheric and temperatures greater than room temperature. The hot press method is further described in U.S. Pat. No. 4,433,120 to Shui-Tung Chiu. Twelve inch by twelve inch panels were cut from the finished good and tested for density, swell and absorption. The results of the test are shown in Table 3.

TABLE 3

| SAMPLE NUMBER | SAMPLE THICKNESS | DENSITY | SWELL | ABSORPTION |
| --- | --- | --- | --- | --- |
| 1 | 7/16 | 43.90 | 20.54 | 32.02 |
| 2 | 7/16 | 44.46 | 13.99 | 25.28 |
| 3 | 7/16 | 44.50 | 12.96 | 20.75 |
| 4 | 7/16 | 42.41 | 13.15 | 21.70 |
| 5 | 7/16 | 44.40 | 20.00 | 34.29 |
| 6 | 7/16 | 43.80 | 20.19 | 33.78 |
| 7 | 5/8 | 46.90 | 18.46 | 26.73 |
| 8 | 5/8 | 48.53 | 16.92 | 26.34 |
| 9 | 5/8 | 45.34 | 17.16 | 27.47 |
| 10 | 5/8 | 44.68 | 21.51 | 33.01 |
| Avg. | Avg. | 44.89 | 17.49 | 28.13 |

The experimental results demonstrate an improved emulsion for use in lignicellulosic composite compositions. Through the use of a polynaphthalenesulfonic acid, lignin compounds and biocides can be eliminated from lignocellulosic composite formulations. The elimination of these two compounds improves the manufacture and cost of the lignocellulosic composite compositions using the emulsions of the present invention.

There has been disclosed in accordance with the principles of the present invention an emulsion and lignocellulosic composite product made using such an emulsion. The emulsion is useful in imparting water-resistance to the lignocellulosic composite product. While certain embodiments and best mode of the present invention are described herein, these embodiments are merely illustrative. It will be apparent to those skilled in the art that modifications may be made therein without departing from the spirit of the invention and the scope of the appended claims.

What is claimed is:

1. An emulsion useful in providing water-resistance to a lignocellulosic composite product, comprising:
    at least one wax;
    an alkyl phenol;
    polynaphthalenesulfonic acid;
    an alkali metal hydroxide;
    water; and
    a complexed starch;
    wherein the alkyl phenol is a $C_{24}$-$C_{34}$ polymerized methylene-coupled alkyl phenol.

2. The emulsion of claim 1 wherein the alkali metal hydroxide is selected from the group consisting of sodium hydroxide and potassium hydroxide.

3. The emulsion of claim 1 wherein the complexed starch is a complex of a starch and a complexing agent selected from the group consisting of a borate compound and a molybdenum compound.

4. The emulsion of claim 3 wherein the complexing agent is sodium tetraborate decahydrate.

5. The emulsion of claim 3 wherein the starch is selected from the group consisting of unmodified starch, acid-modified starch, hydroxyethylated starch, oxidized starch, and cationic starch.

6. The emulsion of claim 3 wherein the starch is acid-modified starch.

7. The emulsion of claim 5 wherein the ratio of the complexing agent to the starch on a weight per weight basis is from about 1:4 to about 1:20.

8. A lignocellulosic composite product containing the emulsion of claim 1.

9. The lignocellulosic composite product of claim 8 wherein the lignocellulosic composite product is an oriented strand board.

10. The lignocellulosic composite product of claim 8 wherein the lignocellulosic composite product is a particle board.

11. The lignocellulosic composite product of claim 8 wherein the lignocellulosic composite product is a fiber board.

12. A method for making an emulsion useful in providing water-resistance to a lignocellulosic composite product, comprising the steps of:
    (a) mixing at least one wax and an alkyl phenol to provide a first pre-mix;
    (b) mixing polynaphthalenesulfonic acid, an alkali metal hydroxide, water, and a complexed starch to provide a second pre-mix;
    (c) combining the first pre-mix and the second pre-mix to provide a mixture; and
    (d) homogenizing the mixture;
    wherein the alkyl phenol is a $C_{24}$-$C_{34}$ polymerized methylene-coupled alkyl phenol.

13. The method of claim 12 wherein the alkali metal hydroxide is selected from the group consisting of sodium hydroxide and potassium hydroxide.

14. The method of claim 12 wherein steps (a) and (b) further comprise heating the first pre-mix and the second pre-mix to a temperature range of about 185° F. to about 195° F.

15. The method of claim 12 wherein step (d) is carried out at a pressure of at least 3500 psi.

16. The method of claim 12 wherein the complexed starch is a complex of a starch and a complexing agent selected from the group consisting of a borate compound and a molybdenum compound.

17. The method of claim 16 wherein the complexing agent is sodium tetraborate decahydrate.

18. The method of claim 16 wherein the starch is selected from the group consisting of unmodified starch, acid-modified starch, hydroxyethylated starch, oxidized starch, and cationic starch.

19. The method of claim 16 wherein the starch is acid-modified starch.

20. The method of claim 18 wherein the ratio of the complexing agent to the starch on a weight per weight basis is from about 1:4 to about 1:20.

21. An emulsion useful in providing water-resistance to a lignocellulosic composite product, comprising:
    at least one wax in an amount of about 25% to about 40% by weight based on the total weight of the emulsion;
    a saponifiable wax in an amount of about 2.5% to about 4.5% by weight based on the total weight of the emulsion;
    an alkyl phenol in an amount of about of about 0.25% to about 10.0% by weight based on the total weight of the emulsion;
    a polynaphthalenesulfonic acid in an amount of about 0.25% to about 5.0% by weight based on the total weight of the emulsion;
    water in an amount of about 55% to about 65% by weight based on the total weight of the emulsion;
    an alkali metal hydroxide in an amount of about 0.5% to about 1.5% by weight based on the total weight of the emulsion; and
    a complexed starch, in an amount of about 1.5% to about 3.5% by weight based on the total weight of the emulsion, the complexed starch comprising a starch and a complexing agent selected from the group consisting of a borate compound and a molybdenum compound, the starch and the complexing agent having a ratio, by weight, of about 4:1 to about 20:1;
    wherein the alkyl phenol is a $C_{24}$-$C_{34}$ polymerized methylene-coupled alkyl phenol.

* * * * *